Patented Sept. 5, 1933

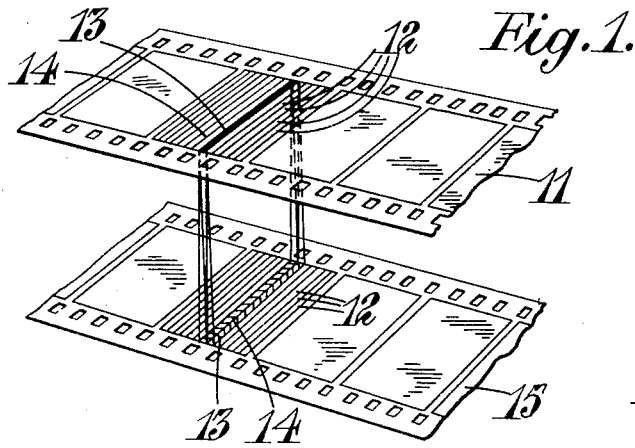
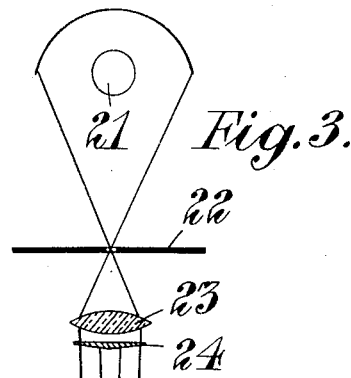
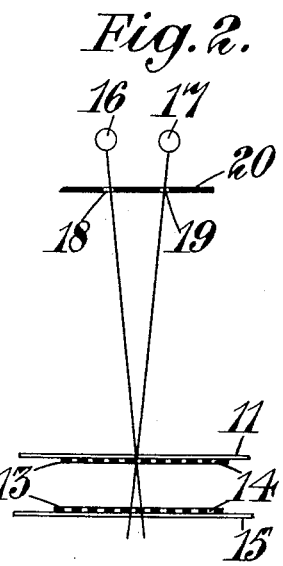
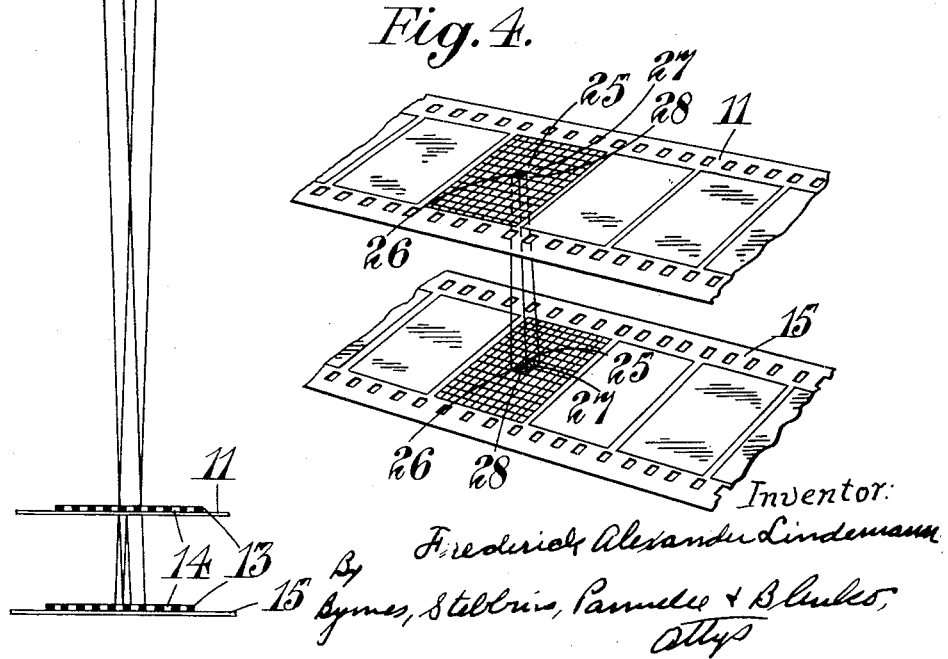

1,925,902

UNITED STATES PATENT OFFICE 1,925,902

APPARATUS FOR REPRODUCING COLOR PHOTOGRAPHS

Frederick Alexander Lindemann, Oxford, England

Application March 9, 1932, Serial No. 597,823, and in Great Britain March 17, 1931

4 Claims. (Cl. 95—75)

This invention relates to improvements in apparatus for printing or reproducing colored photographs on films, of the type having means to place or feed a transparent image-carrying "film" having an image subdivided into minute elements each provided with a corresponding color filter element, and a second similar "film" on to which the images are to be printed, parallel to each other but spaced apart, in front of or past a light-source so that the light passes through the first on to the second film which is to be printed. The term "film" as used herein is intended to include the image-carrying layer on glass plates as well as that on celluloid or other forms of backing.

If the image thus printed is to be subsequently enlarged, as for instance in colored cinematograph films, the pattern of the color filters, which may consist of patches of two, three or more different colors has to be exceedingly fine so as not to offend the eye in the enlarged image. The main disadvantage of this method lies in the fact that it is extremely difficult to copy, print or otherwise reproduce these films since, in order to reproduce the natural colors in the copy, it is necessary when printing or copying to ensure that the color pattern on the primary negative photograph is exactly in register with the color pattern on the secondary plate or film upon which the print or copy is being made. As the pattern of the filters has to be very fine, it is practically impossible to place the original film and the copy in exact register.

In order to overcome this difficulty it has been proposed to space the films apart and to so arrange matters that light passing through each of the minute elements of the first film provided with filter elements is spread or dispersed on the second film, so discounting to some extent the effect of bad registration. In practice, however, this method involves a waste of power for the printing lamp, and the resultant picture lacks definition.

In accordance with the present invention an optical system is arranged to project simultaneously two or more rays of light from different directions through each element of the transparent image film.

While this may be effected by using two or more light-sources it can be accomplished by employing a single light-source and interposing a plurality of prisms between the light-source and the image film to concentrate rays from different directions through each color element thereof. Thus a single light source may be used in combination with a lens to render light parallel from said source, and a plural prism (e. g. a double prism), interposed between the light source and the image film to concentrate parallel light thereon from a plurality of directions and therethrough upon the film to be printed.

The following is a description by way of example of certain specific forms of apparatus embodying the invention, reference being made to the drawing in which:

Figures 1 and 4 are diagrams,

Figure 2 shows one optical system in accordance with the invention, and

Figure 3 shows a second optical system.

Referring to Figures 1 and 2 of the drawing, 11 is a transparent image film bearing an image subdivided into minute elements each provided with corresponding superposed color filter elements 12 (shown to a greatly enlarged scale), which, in the case of the two color film shown, may comprise alternate narrow red and green bands 13 and 14, running across the image. Similarly, film 15, disposed adjacent film 11, but spaced apart therefrom, carries alternate colored bands 13 and 14, and also carries a light sensitive emulsion in the usual way.

The films 11 and 15 are fed by any suitable means, parallel to each other, but spaced apart by an appropriate distance, past lamps 16 and 17 (Figure 2) which direct light through apertures 18 and 19 provided in a stop 20 interposed between the lamps and the film 11. The lamps 16 and 17 and the apertures 18 and 19 are so proportioned that rays of light from both lamps are projected through any part of the film upon which the light falls. Thus, in the simple case illustrated in Figure 2 rays from two different directions are directed through the color and image elements of the film 11 and fall upon film 15.

Considering the case in greater detail, suppose that rays from two different directions pass through a particular color element, red say, carried by film 11, these rays then diverge and fall upon the color filters carried by the film 15 upon which it is desired to reproduce a color image. The optical system and distance apart of the films is designed so that the rays diverging onto film 15 and the color filters carried thereby, cast adjacent images upon the filters, but in monochromatic light corresponding to the particular filter (red) through which they have passed on film 11.

These two complete images have substantially the same area as two color elements upon film 15.

The effect of throwing two similar complete images in monochromatic light upon two adjacent color elements of film 15 is that in the case of the two films being out of register, as illustrated in Figures 2 and 3, one red image will strike a green filter on 15 and not affect the emulsion, while the other red image will strike a red filter and will be transmitted to affect the emulsion. Thus, if the two are slightly out of register, there will always be a part of the light of appropriate color and full intensity falling upon each filter in the secondary film.

In this way any lack of registration is compensated for up to and including the width of a complete filter element.

Although the films are shown for the purposes of the diagrams as somewhat widely spaced apart, it will be understood that as the color-pattern is very minute the films may in practice approach one another rather closely or may even touch, the light sensitive layers being separated from one another by no more, or not much more than the thickness of the glass plate or celluloid backing employed.

In Figure 3 there is illustrated a modified optical system for producing the same effect, wherein a lamp 21 projects light through a single aperture in a stop 22 placed at the principal focus of a lens 23. Thus, light passing through lens 23 is rendered parallel and falls upon a flat double prism 24. Prism 24 causes the incident light to divide into two separate parallel rays and the prism is chosen to cause them to converge towards each other to meet upon the film 11. Thus as previously, two complete similar monochromatic images from each element of film 11 are projected upon film 15.

The same results can be achieved, though usually less conveniently, by using a set of mirrors adjusted to be at appropriate small angles to one another, or by cutting parts of the lens or lenses so that they deviate slightly from the symmetrical shape.

Figure 4 illustrates the invention as applied to a four-color process. Film 11 carries, in this case, minute elements in the form of small squares or dots of the various colors 25, 26, 27 and 28.

By a suitable arrangement of the thin prism or prisms, set of mirrors or suitably cut lens or lenses as described above, and an appropriate adjustment in the optical path, it is possible to produce of each point in the primary film, e. g. each color element 26, four complete monochromatic images upon the film 15 arranged to fit the pattern in which the different color patches are placed. In this way, as described in the simple case for two-color printing, each element on film 15 receives a projection of at least four points of light from the film 11. Only those of appropriate color pass through the color filters on film 15, so that even when the picture is out of register a photographic impression is formed corresponding to the image of film 11.

Producing the multiple images in this way to correspond with the patterns on the films by means of suitable prisms, lenses or arrangements of mirrors has the further advantage, that the relative intensities of the various colours can be adjusted as desired, either by shaping the prism, lenses or mirrors, or by shifting them in the optical path. It is thus easy to ensure that each point on the secondary film receives light from the various colors of the correct intensity so that a copy or print is produced corresponding exactly with the original.

I claim:—

1. Apparatus for reproducing color photographs from one transparent image-carrying film having thereon an image subdivided into minute elements, each provided with a corresponding color filter element onto a second image-receiving film correspondingly subdivided into minute elements each provided with a color filter element, said films being disposed in spaced substantial parallelism, comprising a light source and an optical system which projects simultaneously two or more rays of light from different directions through each color element of the image-carrying film onto the image-receiving film.

2. Apparatus for reproducing color photographs from one transparent image-carrying film having thereon an image subdivided into minute elements, each provided with a corresponding color filter element onto a second image-receiving film correspondingly subdivided into minute elements each provided with a color filter element, said films being disposed in spaced apart substantial parallelism, comprising a light source and a plurality of prisms interposed between the light source and the image-carrying film, whereby light rays from different directions are concentrated through each color element of the image-carrying film onto the image-receiving film.

3. Apparatus for reproducing color photographs from one transparent image-carrying film having thereon an image subdivided into minute elements, each provided with a corresponding color filter element onto a second image-receiving film correspondingly subdivided into minute elements each provided with a color filter element, said films being disposed in spaced apart substantial parallelism, comprising a light source and an optical system between the light source and the image-carrying film, said optical system having in combination a lens and a plural prism, whereby the image of each color element of the image-carrying film is split into a plurality of images on the image-receiving film.

4. Apparatus for reproducing color photographs from one transparent image-carrying film having thereon an image subdivided into minute elements, each provided with a corresponding color filter element onto a second image-receiving film correspondingly subdivided into minute elements each provided with a color filter element, said films being disposed in spaced apart substantial parallelism, comprising a light source, a lens and a plural prism interposed between the light source and the image-carrying film, whereby parallel rays of light from the light source are concentrated on the image-carrying film and therethrough upon the image-receiving film.

FREDERICK ALEXANDER LINDEMANN.